United States Patent [19]

Zimbelman

[11] Patent Number: 5,211,360
[45] Date of Patent: May 18, 1993

[54] SPACECRAFT THERMAL DISTURBANCE CONTROL SYSTEM

[75] Inventor: Darrell F. Zimbelman, Gaithersburg, Md.

[73] Assignee: Fairchild Space and Defense Corporation, Germantown, Md.

[21] Appl. No.: 721,418

[22] Filed: Jun. 26, 1991

[51] Int. Cl.$^5$ .............................................. B64G 1/24
[52] U.S. Cl. .................... 244/164; 244/158; 244/168; 244/173; 364/434
[58] Field of Search ............................. 364/432, 434; 244/158 R, 164, 165, 168, 170, 173, 158 A

[56] References Cited

U.S. PATENT DOCUMENTS

| | | | |
|---|---|---|---|
| 3,681,583 | 8/1972 | Kubo et al. | 244/166 X |
| 3,968,352 | 7/1976 | Ardeen | 244/164 X |
| 4,071,211 | 1/1978 | Muhlfelder et al. | 364/434 X |
| 4,325,124 | 4/1982 | Renner | 244/173 X |
| 4,345,728 | 8/1982 | Neufeld | 244/168 |
| 4,732,354 | 3/1988 | Lierre | 244/168 X |
| 4,949,922 | 8/1990 | Rosen | 244/168 |
| 5,020,745 | 1/1991 | Stetson | 364/434 |

Primary Examiner—Galen Barefoot
Assistant Examiner—Christopher P. Ellis
Attorney, Agent, or Firm—Michael W. York

[57] ABSTRACT

A spacecraft thermal disturbance control system for controlling the torque exerted on the main portion of a spacecraft as a result of a thermal gradient being applied to a portion of the spacecraft that projects from the spacecraft's main portion. The spacecraft thermal disturbance control system includes a network of distributed temperature sensors located on the surfaces of the projecting portion of the spacecraft, a microcomputer operatively connected to the temperature sensors for receiving temperature information from the temperature sensors and a reaction wheel assembly operatively connected to the microcomputer. The microcomputer provides command signals to the reaction wheel assembly based upon temperature information received from the temperature sensors to cause the reaction wheel assembly to generate a torque that counteracts the torque exerted on the main portion of the spacecraft as a result of the thermal gradient applied to the projecting portion of the spacecraft.

14 Claims, 3 Drawing Sheets

SPACECRAFT THERMAL DISTURBANCE CONTROL SYSTEM

BACKGROUND OF THE INVENTION

Thermal elastic shock (TES) that spacecraft can experience is attributed to a disturbance torque created by the presence of a sunlit and a shadowed section of the orbit plane. The darkened region is formed as the Earth moves between the satellite and sun, thus eclipsing the satellite view of the sun. The eclipsed portion of the orbit is referred to as the umbra and the transition to and from this region is called the penumbra. Thermal elastic shock is a result of a rapidly changing temperature difference between the hot (sun pointing) and cold (anti-sun pointing) surfaces of a large flexible appendage extending away from the spacecraft. The temperature offset across the two surfaces quickly decreases at umbra entrance when the solar heat flux is turned off in a stepwise fashion, thus subjecting the flexible structure to a rapid cooling effect. In a similar respect, the thermal gradient quickly increases as the appendage experiences rapid heating during umbra exit when the solar flux turns on in a stepwise manner. The rapid change of the thermal gradient causes the hot surface of the structure to bend due to either thermal compression (sunset) or thermal expansion (sunrise). The thermally induced bending motion of the flexible member generates a disturbance torque which is then transferred back onto the space vehicle core-body.

To minimize or eliminate the TES disturbance torque, feasible solutions, other than the solution offered by this invention, do exist. One obvious solution is to alter the material properties of the disturbing member so that the thermal gradient at umbra entrance and exit is not so dramatic. However, this solution must be pursued during the design phase of a spacecraft before the hardware development begins. If the hardware phase is already underway, redesigning the structure will be quite costly. Furthermore, prior to the research leading to this invention a detailed TES disturbance model was unavailable to determine the effect of the TES disturbance on the spacecraft attitude pointing performance. Thus an accurate upper bound of the allowable thermal gradient to maintain pointing accuracy was also unavailable.

Another solution is to impose structural constraints on the appendage to increase rigidity and structural damping. As in the case of the first alternative solution, this solution also requires additional analysis to determine the required stiffness to minimize pointing errors introduced by the TES disturbance. Although this solution may not be as costly as the first alternative approach, some additional costs would be involved. Again, the use of the TES disturbance model is needed to produce estimates of the vehicle attitude pointing performance.

A final approach would be to use feed forward compensation techniques in the vehicle attitude control system to minimize the effect of the TES disturbance. Although this solution seems to be the easiest and cheapest to employ, it can be quite deceiving. This approach would require a software change in the vehicle on-board computer and some resource to obtain thermal gradient measurements. The TES disturbance equations would be an integral part of the software needed to predict the magnitude of the TES disturbance. However, current reaction wheel assemblies (RWA's) reach their maximum torque authority responding to the TES disturbance as evidenced and predicted for some spacecraft (i.e. TOPEX, LANDSAT). Thus the feed forward torque prediciton method may provide little or no compensation. An actuator capable of generating larger torques would be necessary for the feed forward compensation technique to be valid. Unfortunately, current RWA designs do not produce enough torque and new RWA's would be costly to develop. Large torque actuators, such as a control moment gyroscope (CMG), could provide the necessary torque to eliminate the TES disturbance, but CMG's are bulky, heavy and require a large power input. Also, for small satellites, CMG's are not a practical solution.

All of the preceeding described solutions would only be valid for the individual spacecraft under consideration. Furthermore, these solutions would require the use of the previously mentioned TES torque equations. The spacecraft thermal disturbance control system invention overcomes these previous problems. With this invention it is possible to effectively counter the effects of thermal elastic shock without changing the materials used in the manufacture of portions of the spacecraft. Moreover, this invention does not require the redesign of the spacecraft. In fact, it is possible to retrofit many spacecraft to use this invention without any extensive redesign or increases in cost. The localized active control system solution of this invention on the other hand, would still require the use of the TES disturbance model, but would not be limited to a specific vehicle.

SUMMARY OF THE INVENTION

This invention relates to thermal disturbance control systems and more particularly to thermal disturbance control systems for spacecraft.

It is accordingly an object of the invention to provide a spacecraft thermal disturbance control system that effectively compensates for thermal disturbances to which the spacecraft is subjected.

It is an object of the invention to provide a spacecraft thermal disturbance control system that effectively reduces unwanted thermal torque on the spacecraft.

It is an object of the invention to provide a spacecraft thermal disturbance control system that permits the spacecraft to be accurately positioned.

It is an object of the invention to provide a spacecraft thermal disturbance control system that permits the spacecraft to be accurately maintained in position.

It is an object of the invention to provide a spacecraft thermal disturbance control system that reduces undesired torques on the spacecraft resulting from spacecraft structure that is exposed to a temperature differential.

It is an object of the invention to provide a spacecraft thermal disturbance control system that reduces undesired torques on the spacecraft resulting from the spacecraft structure being partially exposed to sunlight.

It is an object of the invention to provide a spacecraft thermal disturbance control system that does not involve the main spacecraft attitude control system.

It is also an object of the invention to provide a spacecraft thermal disturbance control system that is particularly useful for spacecraft that have structures with large areas that are subjected to sunlight-shadow transitions.

It is also an object of the invention to provide a spacecraft thermal disturbance control system that is particularly useful for spacecraft that have non-symmetric projecting structures.

It is an object of the invention to provide a spacecraft thermal disturbance control system that does not require any significant changes to the structure of the spacecraft.

It is an object of the invention to provide a spacecraft thermal disturbance control system that does not require changes to the materials used in constructing the spacecraft.

It is an object of the invention to provide a spacecraft thermal disturbance control system that does not require any significant additions to the spacecraft structure.

It is an object of the invention to provide a spacecraft thermal disturbance control system which provides a solution to a thermal disturbance problem where currently there is no effective solution.

It is an object of the invention to provide a spacecraft thermal disturbance control system that does not add significant weight to the spacecraft.

It is an object of the invention to provide a spacecraft thermal disturbance control system that is simple in its construction.

It is also an object of the invention to provide a spacecraft thermal disturbance control system that is simple in its operation.

It is also an object of the invention to provide a spacecraft thermal disturbance control system that is very reliable.

These and other objects are obtained from the present spacecraft thermal disturbance control system that includes a plurality of temperature sensors located on a portion of a spacecraft that projects from the main portion of the spacecraft and control means including a microprocessor operatively connected to the plurality of temperature sensors for receiving temperature information from the temperature sensors and for providing commands based upon the received temperature information. The spacecraft thermal disturbance control system also includes a reaction wheel assembly operatively connected to the control means for receiving commands from the control means and providing a torque based upon the received commands to counter the torque induced as a result of a thermal gradient being applied to the projecting portion of the spacecraft.

BRIEF DESCRIPTION OF THE DRAWINGS

The invention will be hereinafter more fully described with reference to the appended drawings in which.

DETAILED DESCRIPTION OF THE PREFERRED EMBODIMENT

Figure 1:
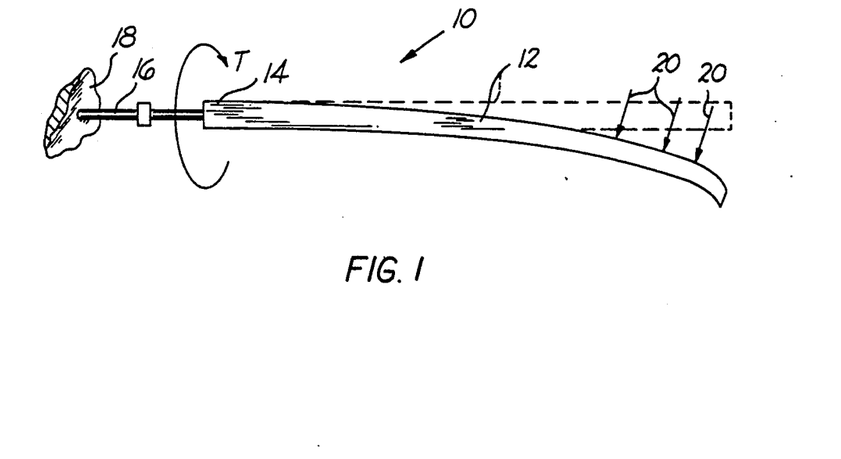
FIG. 1 is a side elevational view of a spacecraft panel and associated structure illustrating the effect of thermal disturbance on the spacecraft.

Referring first to FIG. 1, a portion of a prior art spacecraft appendage is illustrated and is designated generally by the number 10. The spacecraft structure 10 comprises a spacecraft solar panel 12 whose inner end portion 14 is rigidly attached to the shaft 16 that is in turn connected to the main portion of the spacecraft designated by the number 18 with only a portion thereof illustrated for clarity. The normal position of the solar panel 12 is that illustrated by the dashed lines. Then when the solar panel 12 is subjected to uneven heating due to the action of sunlight represented by the arrows 20 incident upon the panel 12 in an uneven manner this causes portions of the panel 12 to expand and become distorted as indicated by the panel 12 that is shown in solid lines. This distortion represented by the solid line panel 12 results in a torque represented by the arrow and the letter T in FIG. 1 being applied to the main portion of the spacecraft 18 through the shaft 16. This torque T can have very undesireable effects upon the spacecraft 10 including causing the spacecraft 10 to move from its desired location in space.

Obviously, the undesired effects of unwanted torque T can have serious adverse consequences including preventing a spacecraft from completing its planned mission. At the very least, it could cause the spacecraft to expend important fuel to regain or maintain its desired position in space. This can result in shortening the useful lifetime of the spacecraft. These undesired effects can be eliminated or greatly reduced through the use of this invention.

Figure 2:
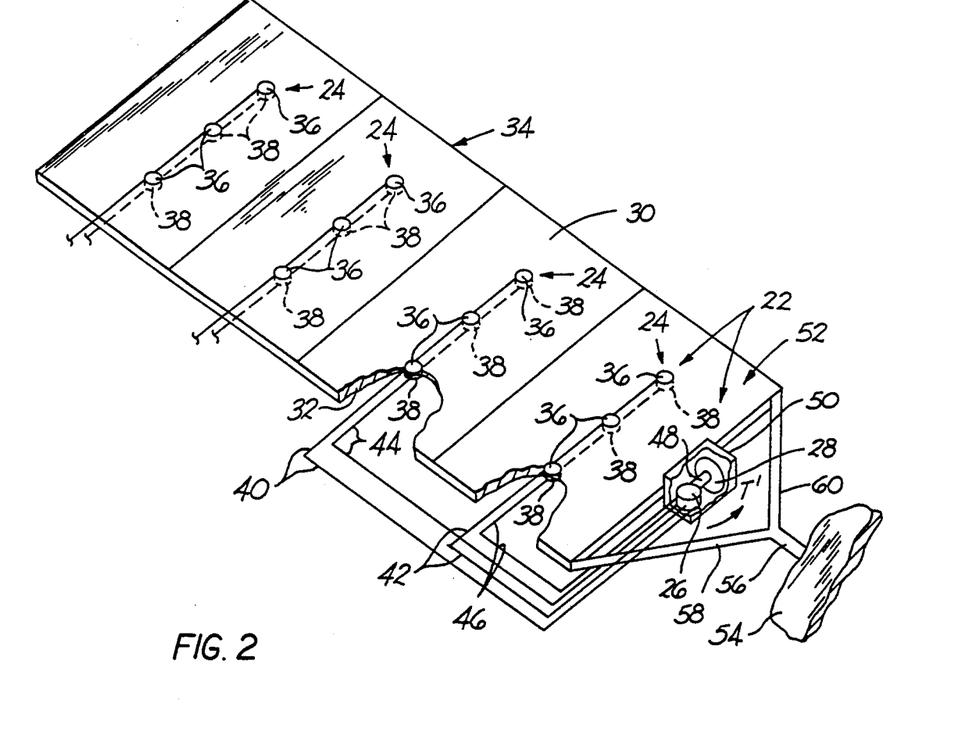
FIG. 2 is a perspective view of the spacecraft thermal disturbance control system located on a spacecraft solar array panel.

As illustrated in FIG. 2, the spacecraft thermal disturbance control system is designated generally by the number 22 and comprises a thermal sensor network 24, a micro-computer 26 and a small reaction wheel assembly (RWA) 28. The thermal sensor network 24 comprises a plurality of distributed thermal sensors strategically mounted on each face 30 and 32 of the spacecraft solar panel 34. As illustrated, the thermal sensors are arranged so that there is a first series of thermal sensors designated by the number 36 on the one side or face 30 of the solar panel 34 and a second series of thermal sensors designated by the number 38 on the other face or side 32 of the solar panel 34.

Each thermal sensor of the first series of thermal sensors 36 is connected individually to the micro-computer 26 as illustrated in FIG. 2 by the electrical leads 40 and 42 that electrically connect thermal sensors 36 to the microcomputer 26 and the electrical leads 44 and 46 that electrically connect the thermal sensors 38 to the microcomputer 26. It should be noted that although only a few of the thermal sensors 36 and 38 are illustrated as being connected by the respective leads 40 and 42 and 44 and 46 to the microcomputer 26, all of the thermal sensors 36 and 38 would be individually electrically connected to the microcomputer 26, but the other leads have been omitted for clarity and since they are not necessary for an understanding of the invention or to teach one skilled in the art how to practice the invention.

As illustrated in FIG. 2 the microcomputer 26 is electrically connected to the RWA 28 by the electrical conductor cable 48 and both the microcomputer 26 and the associated RWA 28 are located within the generally rectangular hollow housing 50 and connected through the housing 50 to the inner end portion 52 of the spacecraft solar panel 34 so that the reaction wheel assembly 28 is capable of exerting a torque, represented by the arrow and letter $T^1$, upon the inner end portion 52 of the solar panel 34. The inner end portion 52 of the solar panel 34 is connected to the main portion of the spacecraft designated by the number 54 by the rigid shaft 56 and the connected rigid projecting members 58 and 60 that are connected to the shaft 56 and the inner end portion 52 of the solar panel 34. It should be noted that only a portion of the spacecraft main portion 54 is illustrated for clarity.

Figure 3:
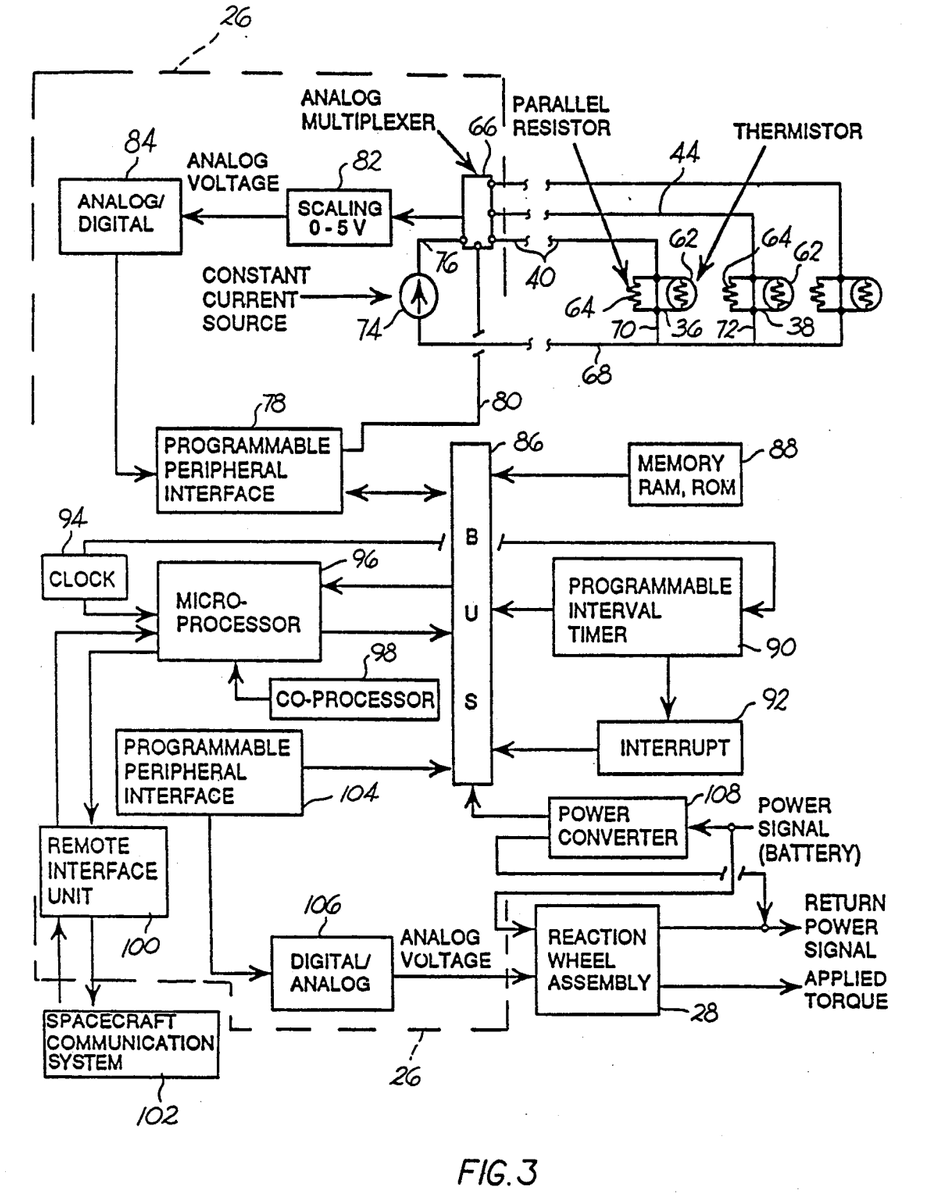
FIG. 3 is a block diagram of the spacecraft thermal disturbance control system illustrated in FIG. 2.

FIG. 3 sets forth the spacecraft thermal disturbance control system 22, previously illustrated in FIG. 2, in block diagram form and provides further details on the composition of the microcomputer 26. As illustrated in FIG. 3, the thermal sensors in the series of thermal sensors 36 and 38 are identical and each thermal sensor comprises a thermistor 62 and a resistor 64 that are connected in parallel. Each of the thermal sensors 36 and 38 are connected electrically to an analog multiplexer 66 that is part of the microcomputer 26 as represented by the leads 40 and 44. The thermal sensors 36 and 38 are also connected to a common lead 68 via the respective leads 70 and 72 and this common lead 68 is connected to a constant electric current source 74 that is in turn connected to the analog multiplexer 66 by the lead 76.

The analog multiplexer 66 is also connected to a programmable peripheral interface (PPI) circuit 78 that also forms part of the microcomputer via the lead 80. The output from the analog multiplexer 66 that contains information from the series of thermal sensors 36 and 38 is sent as represented by the arrow to a scaling circuit 82 and then the output of the scaling circuit 82 that is an analog voltage is sent to an analog to digital (A/D) converter 84 as represented by the arrow. Both the scaling circuit 82 and the A/D converter 84 also form part of the microcomputer 26. As indicated by the arrow, the output of the A/D converter is sent to the PPI circuit 78 that also receives and sends information, as represented by the arrows, from and to a common bus 86 that also forms part of the microcomputer 26.

As also illustrated, the memory 88, the programmable interval timer (PIT) 90 and the interrupt 92 each provide inputs represented by the respective arrows to the common bus 86. It will be noted that the memory 88 comprises both a random access memory (RAM) and a read only memory (ROM) and that the PIT timer 90 receives information represented by the arrow from a clock 94 that also forms part of the microcomputer 26 and that the PIT 90 also provides an input represented by the arrow to the interrupt 92. A microprocessor 96, associated co-processor 98 and a remote interface unit (RIU) 100 also form part of the microcomputer 26 and as illustrated by the various arrows the microprocessor 96 receives information from the clock 94, the bus 86 and the co-processor 98 as well as the RIU 100. The microprocessor 96 as indicated by the arrows also provides information to the bus 86 and to the RIU 100. The RIU 100 would in turn as indicated by the arrows be receiving information from and transmitting information to the spacecraft communication system 102 or the like located exterior to the spacecraft.

As illustrated in FIG. 3, the microcomputer 26 also has a second PPI circuit 104 and a digital to analog (D/A) converter 106 and as illustrated by the arrows, the PPI circuit 104 provides information to both the bus 86 and to the D/A converter 106. As indicated by the arrow, the D/A converter 106 provides an analog voltage input to the RWA represented by the block numbered 28 and as indicated the RWA 28 provides an applied torque and a return power signal. The microcomputer 26 also includes the power converter 108 that, as indicated by the arrow, receives power from an external source such as the battery on the spacecraft (not shown). The power converter 108, as indicated by the arrows, also provides an input to the bus 86 and to the return power signal. It will also be noted, as indicated by the arrow, that the external source of power such as the spacecraft battery (not shown) provides power directly to the RWA 28 to provide its required operational power.

Figure 4:
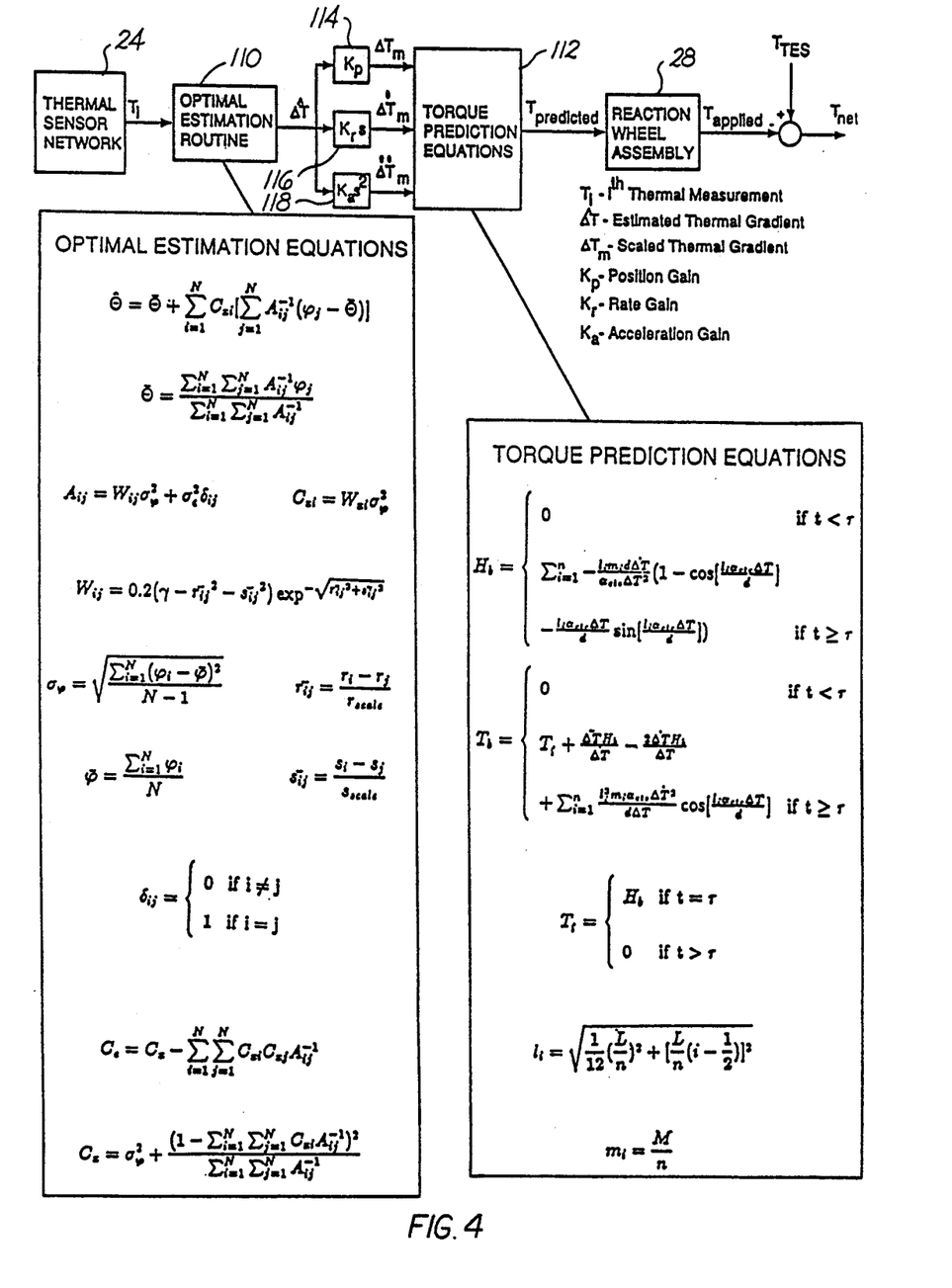
FIG. 4 is a functional block diagram illustrating how the spacecraft thermal distrubance control system of FIGS. 2 and 3 functions and certain equations used during the functioning.

The flexibility built into the software design will allow on-orbit adjustments to accommodate the true nature of the TES disturbance torque. The complete system functional block diagram is depicted in FIG. 4. An inspection of FIG. 4 shows that the system uses the thermal sensor network 24 to provide temperature measurements at various locations on the solar array. The measurement data are then fed into an optimal estimation computer routine designated by the block numbered 110. This routine is based on the Gauss-Markov theorem and has been used extensively in the fields of meteorology and oceanography. An optimal estimate of the thermal gradient that exists across the panel at a desired location is then used to predict the magnitude of TES disturbance torque using the detailed analytical model that will be hereinafter developed that provides the torque prediction equations represented by the block 112. The generated torque prediction Tp is used to drive the RWA 28. The applied torque Ta from the RWA 28 that combines with and counteracts the torque caused by TES that gives a greatly diminished net torque Tnet. As indicated in FIG. 4, temperature gains, Kp, Kr, and Ka are included in the software to tailor the system response as indicated by the blocks 114, 116, and 118.

The optimal estimation routine equations set forth in FIG. 4 are developed as follows. A linear form of the observations is assumed and can be expressed as:

$$\theta_i = \Theta(r,s) + \epsilon_i \qquad (1)$$

For i=1, ..., N where
$\phi_i \equiv i^{th}$ measurement
$\epsilon_i \equiv i^{th}$ measurement error
N≡total number of observations
$\Theta(r,s)$≡scalar variable at position(r,s)

Furthermore, the assumption is made that the measurement errors are un-correlated and independent of $\theta$. Under these assumptions, the Gauss-Markov theorem, provides the resulting estimation equation given as follows:

$$\hat{\Theta} = \bar{\Theta} + \sum_{i=1}^{N} C_{xi} \left[ \sum_{j=1}^{N} A_{ij}^{-1} (\theta_i - \Theta) \right] \qquad (2)$$

where
$\bar{\Theta}$≡estimated mean of the observations
$A_{ij}$≡covariance between all pairs of observations
$C_{zi}$≡covariance between the estimate and the $i^{th}$ observation
and the associated error matrix, $C_e$ given as:

$$C_e = C_x - \sum_{i=1}^{N} \sum_{j=1}^{N} C_{xi}C_{xj}A_{ij}^{-1} \quad (3)$$

The estimated mean of the observations is computed such that the sum of the weighted measurements equal zero and is determined by the following equation:

$$\bar{\theta} = \frac{\sum_{i=1}^{N} \sum_{j=1}^{N} A_{ij}^{-1}\theta_j}{\sum_{i=1}^{N} \sum_{j=1}^{N} A_{ij}^{-1}} \quad (4)$$

The previous three equations are thus used to provide an optimal estimate of a solar array temperature at a prescribed location and the error associated with the estimate.

The key to implementing the optimal estimation technique is the determination of both the $C_x$ matrix and an analytic weighting function to scale the variance of the data. The weighting function is necessary to compute numerical values for the $C_{xi}$ and $A_{ij}$ matrices. The $C_x$ matrix is generally unknown but can be approximated by the variance of the given data set. The numerical computation of $C_x$ is generated using the following equation:

$$C_x = \sigma_\theta^2 + \frac{\left(1 - \sum_{i=1}^{N}\sum_{j=1}^{N} C_{xi}A_{ij}^{-1}\right)^2}{\sum_{i=1}^{N}\sum_{j=1}^{N} A_{ij}^{-1}} \quad (5)$$

where $\sigma_\phi$ is the standard deviation of the measurement data given as:

$$\sigma_\theta = \sqrt{\frac{\sum_{i=1}^{N}(\theta_i - \bar{\theta})^2}{N-1}} \quad (6)$$

with $$\theta = \frac{\sum_{i=1}^{N}\theta_i}{N} \quad (7)$$

The last term on the right hand side of equation (5) accounts for uncertainties associated with the estimated mean.

A weighting function is selected to weight the measurements according to their spatial location with respect to one another and to the desired position of the estimate. This type of weighting function can be used as a first cut statistical model given no a priori knowledge of the data statistics. The estimation technique can, however, easily accommodate more complex statistical models if desired. An analytical expression for the weighting function is given as:

$$W_{ij} = 0.2(\gamma - \bar{r}_{ij}^2 - \bar{s}_{ij}^2)\exp^{-\sqrt{r_{ij}^2 + s_{ij}^2}} \quad (8)$$

where $\gamma \equiv$ measurement degradation factor $r_{ij} \equiv$ scaling parameter between the $i^{th}$ and $j^{th}$ observations in the r direction $s_{ij} \equiv$ scaling parameter between the $i^{th}$ and $j^{th}$ observations in the s direction The parameter $\gamma$ is introduced to change the quality of the observations. If $\gamma$ is set equal to 5.0, then a maximum correlation of 1.0 will exist when the condition $i=j$ is satisfied in the equation (8) set forth above. As $\gamma$ linearly decreases, the maximum attainable correlation also decreases in a linear fashion. The scaling parameters, $r_{ij}$ and $s_{ij}$, are calculated using the following equations:

$$\bar{r}_{ij} = \frac{r_i - r_j}{r_{scale}} \quad (9)$$

and $$\bar{s}_{ij} = \frac{s_i - s_j}{s_{scale}} \quad (10)$$

The variables $r_{scale}$ and $s_{scale}$ can be specified to determine an effective range of data influence (de-correlation scale) or set to the dimensions of the spatial area over which the measurements are confined. For the present invention, the latter condition is assumed. The variables $r_i$ and $s_i$ denote the spatial location of the $i^{th}$ observation while the variables $r_j$ and $s_j$ indicate the spatial position of the $j^{th}$ point. Thus, given the weighting function, a spatially weighted covariance can be computed between the point of estimation and the measurements, $C_{xi}$, and between the observations themselves, $A_{ij}$. The calculation of $C_{xi}$ can be expressed by:

$$C_{xi} = W_{xi}\sigma_\phi^2 \quad (11)$$

where the subscript x is used to denote the desired location, $(r_x, s_x)$, of the estimate, while the weighted observation matrix, $A_{ij}$, is determined from the following equation:

$$A_{ij} = W_{ij}\sigma_\phi^2 + \sigma_\epsilon^2\delta_{ij} \quad (12)$$

where $\delta_{ij}$ is the Kronecker delta function expressed as:

$$\delta_{ij} = \begin{cases} 0 & \text{if } i \neq j \\ 1 & \text{if } i = j \end{cases} \quad (13)$$

and $\sigma_\epsilon$ the standard deviation of the error.

The torque prediction equations set forth in FIG. 4 are developed in the following manner. The following equation gives a rough approximation of the radius of curvature for a rod like structure such as that illustrated in FIG. 1 when it is exposed to a temperature difference $\Delta T$:

$$\rho_b = \frac{d}{a_{cte}\Delta T} \quad (14)$$

The above relation holds true for both the top and bottom rods (i.e. $\rho b \approx \rho b_{top} \approx \rho b_{bottom}$) under the assumption that the separation distance is small, $d << \rho_b$.

The mass distribution about the fixed end of the slender rod is given by:

$$I = \frac{1}{12}L^2M + \frac{1}{4}L^2M \quad (15)$$

where
L = rod length
M = rod mass

If the rod length and mass are divided into n pieces then a discrete representation for the rod inertia becomes:

$$I = \sum_{i=1}^{n} \left( \frac{1}{12} \left( \frac{L}{n} \right)^2 m_i + \left[ \frac{L}{n} \left( i - \frac{1}{2} \right) \right]^2 m_i \right) \quad (16)$$

where the $i^{th}$ mass element is expressed as:

$$m_i = \frac{M}{n} \quad (17)$$

By factoring out the mass term, the equation (16) above can be rewritten as an equivalent inertia distribution (lumped mass) given as:

$$I = \sum_{i=1}^{n} l_i^2 m_i \quad (18)$$

where $l_i$ is of the form:

$$l_i = \sqrt{\frac{1}{12} \left( \frac{L}{n} \right)^2 + \left[ \frac{L}{n} \left( i - \frac{1}{2} \right) \right]^2} \quad (19)$$

Let $I_b$ be an equivalent inertial displacement defined as the rod inertia, in the equation previous to the one above, multiplied by the angle through which the structure rotates relative to the constrained end. The structure is assumed to deform in a circular arc of radius pb under the influence of a uniform temperature gradient applied over the entire length. Then for the $i^{th}$ inertia element and the bend angle of the $i^{th}$ mass element:

$$I_b = \sum_{i=1}^{n} l_i^2 m_i \theta_i \quad (20)$$

The arc length each element of mass travels is given by:

$$s_i = l_i \theta_i \quad (21)$$

Rearranging and substituting the expression for arc length, equation (21), into equation (20) above yields:

$$I_b = \sum_{i=1}^{n} l_i m_i s_i \quad (22)$$

The change in radius of curvature associated with each $l_i$ increment is expressed as follows:

$$\Delta p_b = p_b - p_b \cos(\phi_i) \quad (23)$$

where the curvature angle, $\phi_i$, associated with the $i^{th}$ inertia length element is given by:

$$\tan \phi_i = \frac{l_i}{p_b} \quad (24)$$

If the assumption is made that each inertia length increment is small compared to the radius of curvature, such that the ratio $l_i/p_b < 0.176$, then the curvature angle $\phi_i$, is less than 10 degrees. Under this assumption, the curvature angle for the $i^{th}$ element can be simplified as:

$$\phi_i \approx \frac{l_i}{p_b} \quad (25)$$

If it is further assumed that each mass element only travels through a small angle, $\theta_i < 10$ degrees, then the arc length, is essentially linear and equal to the change in radius of curvature given by the third equation above. This approximation can be stated as:

$$s_i \approx \Delta p_b \quad (26)$$

Thus from the previous two equations (23) and (25) and equation (26) above, $$s_i \approx p_b - p_b \cos\left( \frac{l_i}{p_b} \right) \quad (27)$$

Substituting the arc length equation (27) above into the derived expression for $I_b$, equation (22) yields:

$$I_b \approx \sum_{i=1}^{n} l_i m_i p_b \left[ 1 - \cos\left( \frac{l_i}{p_b} \right) \right] \quad (28)$$

The previous equation defines a general analytical expression to describe the dynamic motion of a slender rod of finite thickness given an applied thermal gradient. This equation can also be used to represent the movement of thin beams and thin flat plates since each geometric figure shares a common expression for the inertia about one end.

Intuitively, the first and second time derivatives of the previous equation (28) would yield the momentum and torque time histories describing the TES disturbance. The resulting torque function calculated using the previous equation only captures the latter part (i.e. the exponentially decaying step) of the overall disturbance. This is because $I_b$ is a multi-valued function at $t = \tau$ which yields a step discontinuity at $t = \tau$ for the first time derivative of $I_b$. Neglecting the step discontinuity in the second time derivative eliminates the impulsive term present in the expected structure of the disturbance torque. Thus, in order to capture the disturbance torque function which completely characterizes the observed on-orbit attitude response, fundamental continuous theoretical functions are derived to explain the underlying mathematics behind the TES phenomena. In the following development a continuous function for $I_b$, analogous to the discrete $I_b$ expression given in the previous equation (28), will be developed.

Let $I_b$ be defined as a continuous function of the form:

$$I_b = \alpha[\mu(t+\infty) - \mu(t-\tau)] + f(t-\tau)\mu(t-\tau) \quad (29)$$

where $a \equiv$ constant $f(t - \tau) \equiv$ given function of time and $u(t-\tau)$ is a unit step function defined as:

$$u(t - \tau) = \begin{cases} 0 & \text{if } t < \tau \\ 1 & \text{if } t \geq \tau \end{cases} \quad (30)$$

In order for $I_b$ to be continuous at $t=r$, the following matching condition must hold true:

$$f(t-r)|_{t=r} = a \quad (31)$$

Momentum is defined as the first derivative of $I_b$ with respect to time, i.e. $dI_h/dt$. Computing the first time derivative of equation (29) above gives the following expression for momentum:

$$H_b = a[\bar{u}(t + \infty) - \bar{u}(t - \tau)] + \dot{f}(t - \tau)\bar{u}(t - \tau) + f(t - \tau)\dot{u}(t - \tau) \quad (32)$$

where $\dot{u}(t-\tau)$ is a Dirac function described as:

$$\dot{u}(t - \tau) = \begin{cases} \infty & \text{if } t = \tau \\ 0 & \text{otherwise} \end{cases} \quad (33)$$

The second derivative of equation (29) with respect to time, yields the equation for the torque:

$$T_b = a[\ddot{u}(t + \infty) - \ddot{u}(t - \tau)] + f(t - \tau)\ddot{u}(t - \tau) + 2\dot{f}(t - \tau)\dot{u}(t - \tau) + \ddot{f}(t - \tau)u(t - \tau) \quad (34)$$

It is assumed that all terms containing the derivatives of the unit step function $u(t+\infty)$, i.e. $\dot{u}(t+\infty)$ and $\ddot{u}(t+\infty)$, have no contribution to the dynamics at $t \geq 0$. Thus, the previous momentum and torque equations (32) (34) reduce to the following form:

$$H_b = -a\dot{u}(t - \tau) + f(t - \tau)\dot{u}(t - \tau) + \dot{f}(t - \tau)u(t - \tau) \quad (35)$$

$$T_b = -a\ddot{u}(t - \tau) + f(t - \tau)\ddot{u}(t - \tau) + 2\dot{f}(t - \tau)\dot{u}(t - \tau) + \ddot{f}(t - \tau)u(t - \tau) \quad (36)$$

The doublet, $u(t-r)$ in the above equation (36) which is multiplied by the function $f(t-r)$ can be expressed as two terms given as:

$$f(t-r)\ddot{u}(t-r) = f(0)\dot{u}(t-r) - \dot{f}(0)u(t-r) \quad (37)$$

Finally, if the matching condition, equation (31), requiring $I_b$ to be continuous at $t=\tau$ and the doublet equation (37) above are applied to both the momentum and torque equations, these expressions further reduce to the following:

$$H_b = \dot{f}(t-r)u(t-r) \quad (38)$$

$$T_b = \ddot{f}(t-r)u(t-r) + \dot{f}(t-r)\dot{u}(t-r) \quad (39)$$

The fundamental relationships given by these equations (38) and (39) can be used to compute the TES disturbance momentum and torque using the time derivatives of the known function $f(t-r)$. An inspection of equation (38) above indicates that the momentum is comprised of the first time derivative of the function $f(t-r)$ multiplied by a unit step function.

In order to determine the functional form of $f(t-r)$, a time dependent analytical relationship for the thermal gradient is assumed. Using an analytical function to represent the thermal gradient is advantageous in that the derivatives may be computed continuously rather than by an approximate first-order difference technique. A relatively simple exponential function has been chosen to represent the thermal gradient. The analytical thermal gradient function for umbra entrance is expressed as:

$$\Delta T_{sunset} = \begin{cases} q & \text{if } t < \tau_{sunset} \\ c e^{\frac{-(t-\tau_{sunset})}{k}} + b & \text{if } \tau_{sunset} \leq t < \tau_{sunrise} \end{cases} \quad (40)$$

where
$k$ = decay constant
$b$ = temperature bias
$c$ = temperature scaling
$q$ = temperature constant
$\tau_{sunset}$ = umbra entrance time constant A similar expression is used for sunrise and is given by:

$$\Delta T_{sunrise} = \begin{cases} b & \text{if } \tau_{sunset} < t < \tau_{sunrise} \\ c\left(1 - e^{\frac{-(t-\tau_{sunrise})}{k}}\right) + b & \text{if } t \geq \tau_{sunrise} \end{cases} \quad (41)$$

with $\tau_{sunrise}$ being the umbra exit time constant. The parameters used to calculate $\Delta T_{sunset}$ and $\Delta T_{sunrise}$ can be prescribed to match the predicted thermal response of the structure. Substituting previously developed equations (14) and (40) into equation (28) yields the following expressions for $I_b$ at sunset:

$$I_{bsunset} \approx \sum_{i=1}^{n} \left[ \frac{l_i m_i d}{\alpha_{cte} q} \left(1 - \cos\left[\frac{l_i \alpha_{cte} q}{d}\right]\right)\right] + \quad (42)$$

$$\sum_{i=1}^{n} \left[ \frac{l_i m_i d}{\alpha_{cte}\left[c e^{\frac{-(t-\tau_{sunset})}{k}} + b\right]} \left(1 - \cos\left[\frac{l_i \alpha_{cte}\left[c e^{\frac{-(t-\tau_{sunset})}{k}} + b\right]}{d}\right]\right)\right]$$

Substituting previously developed equations (14) and (41) into the discrete equation (28) for the inertial displacement yields the following expressions for $I_b$ at sunrise:

$$I_{bsunrise} \approx \sum_{i=1}^{n}\left[\frac{l_i m_i d}{\alpha_{cte} b}\left(1 - \cos\left[\frac{l_i \alpha_{cte} b}{d}\right]\right)\right] + \quad (43)$$

$$\sum_{i=1}^{n} \left[\frac{l_i m_i d}{\alpha_{cte}\left[c\left(1 - e^{\frac{-(t-\tau_{sunrise})}{k}}\right) + b\right]}\right]$$

-continued $$\left(1 - \cos\left[\frac{l_i\alpha_{cte}\left[c\left(1 - e^{\frac{-(t-\tau_{sunrise})}{k}}\right) + b\right]}{d}\right]\right)\right]$$

It can be seen that equation (42) above is equivalent to the previously developed equation for the continuous inertial displacement (29) with:

$$a_{sunset} = \sum_{i=1}^{n}\left[\frac{l_im_id}{\alpha_{cte}q}\left(1 - \cos\left[\frac{l_i\alpha_{cte}q}{d}\right]\right)\right] \quad (44)$$

and $$f(t - \tau_{sunset}) = \sum_{i=1}^{n}\left[\frac{l_im_id}{\alpha_{cte}\left[c\,e^{\frac{-(t-\tau_{sunset})}{k}} + b\right]}\right. \quad (45)$$

$$\left(1 - \cos\left[\frac{l_i\alpha_{cte}\left[c\,e^{\frac{-(t-\tau_{sunset})}{k}} + b\right]}{d}\right]\right)\right]$$

Likewise, it is evident that equation (43) above is equivalent to the equation (29) for the continuous inertial displacement with:

$$a_{sunrise} = \sum_{i=1}^{n}\left[\frac{l_im_id}{\alpha_{cte}b}\left(1 - \cos\left[\frac{l_i\alpha_{cte}b}{d}\right]\right)\right] \quad (46)$$

and $$f(t - \tau_{sunrise}) = \sum_{i=1}^{n}\left[\frac{l_im_id}{\alpha_{cte}\left[c\left(1 - e^{\frac{-(t-\tau_{sunrise})}{k}}\right) + b\right]}\right. \quad (47)$$

$$\left(1 - \cos\left[\frac{l_i\alpha_{cte}\left[c\left(1 - e^{\frac{-(t-\tau_{sunrise})}{k}}\right) + b\right]}{d}\right]\right)\right]$$

If the thermal gradient is represented as $\Delta T$ without any subscript, then a general expression for the function $f(t-r)$ can be formulated as:

$$f(t - \tau) = \sum_{i=1}^{n}\left[\frac{l_im_id}{\alpha_{cte}\Delta T}\left(1 - \cos\left[\frac{l_i\alpha_{cte}\Delta T}{d}\right]\right)\right] \quad (48)$$

It is evident that this equation (48) is equivalent to the previous equation (28) for the discrete inertial displacement with pb replaced by the previous equation (14) for the radius of curvature. This result makes sense as the physical relationships used to derive the discrete equation must be contained in the mathematics.

Thus, the momentum and torque equations can be computed using the equations (38) and (39) for $H_b$ and for $T_b$, along with the equation (48) for $f(t-r)$. They are as follows:

$$H_b = \begin{cases} 0 & \text{if } t < \tau \\ \sum_{i=1}^{n}\frac{l_im_id\dot{\Delta T}}{\alpha_{cte}\Delta T^2}\left(1 - \cos\left[\frac{l_i\alpha_{cte}\Delta T}{d}\right]\right) - \\ \frac{l_i\alpha_{cte}\Delta T}{d}\sin\left[\frac{l_i\alpha_{cte}\Delta T}{d}\right]\right) & \text{if } t \geq \tau \end{cases} \quad (49)$$

$$T_b = \begin{cases} 0 & \text{if } t < \tau \\ T_\zeta + \frac{\ddot{\Delta T}H_b}{\Delta T} - \frac{2\dot{\Delta T}H_b}{\Delta T} + \\ \sum_{i=1}^{n}\frac{l_i^3m_i\alpha_{cte}\dot{\Delta T}^2}{d\Delta T}\cos\left[\frac{l_i\alpha_{cte}\Delta T}{d}\right] & \text{if } t \geq \tau \end{cases} \quad (50)$$

with $$T_\zeta = \begin{cases} H_b & \text{if } t = \tau \\ 0 & \text{if } t > \tau \end{cases} \quad (51)$$

where $\dot{\Delta T}$ and $\ddot{\Delta T}$ are the first and second derivatives of the thermal gradient, $\Delta T$, with respect time.

The TES disturbance momentum and torques can be evaluated using these equations for any one of three geometric shapes. These include slender rods, thin beams and thin flat plates. The momentum and torque expressions are entirely dependent on the applied thermal gradient and its successive derivatives along with the mass and material properties of the selected geometric object.

The spacecraft thermal disturbance control system 22 is made and used in the following manner. The dependence of the TES disturbance torque model set forth in FIG. 4 on the successive derivatives of the thermal gradient motivates the need for accurate temperature determinations. To accurately measure the true thermal response of the solar panel 12, two types of thermal sensors, thermistor and platinum resistance thermometers (PRT) known in the art should be utilized for the respective thermistor 62 and resistors 64. Fully integrated (i.e. signal conditioned) thermistor are accurate to about ±4 degrees centigrade (C) while the accuracy of a fully integrated PRT is approximately ±1 degree C.

The microcomputer 26 illustrated in FIGS. 2 and 3 is made from standard space qualified components known to those skilled in the art. The microcomputer 26 is also made and tested using standard techniques known to those skilled in the art. When the microcomputer 26 is in use it functions in the following manner. Alternating thermal measurements are sampled and input into the computer 26 using an analog multiplexer and a PPI 78. Each observation is scaled between 0 and 5 V through the scaling circuit 82 and then digitized using the A/D converter 84. The digitized voltage measurement is then input to the bus 86. The bus 86 also contains connections to the memory 88 with both ROM and RAM, a clock 94, a PIT 90 with interrupt 92, a microprocessor 96 and a second PPI 104 which outputs the commanded wheel voltages. Housed within the memory module is the computer code containing the voltage to temperature conversion factor, the previously developed optimal estimation routine equations, the previously developed TES disturbance torque equations and the RWA torque to voltage conversion. The PIT 90 is used to set the sample rate for the measurement data and select the control system execution rate at which voltage commands are issued to the RWA 28. The microprocessor 96 performs the mathematical calculations and also communicates with the host spacecraft through a RIU 100. The clock 94 keeps the microprocessor 96 active and the co-processor 98 helps to speed the numerical computations. A power supply (not shown), provided by the host vehicle, is connected to a power converter 108 which provides the bus 86 and the RWA 28 with the necessary power for operation. The digital voltage output is sent through a D/A converter 106 to generate an analog voltage which is then used to drive the RWA 28 electronics.

It is estimated that 64K of memory 88 will satisfy the needs of this system. One of the following microprocessor 96 chips, the 8086, 80286 or 80386 supplemented with the proper co-processor 98 chip, 8087, 80287 or 80387, is required for this system. The selection of the microprocessor chip will determine the bit size of the bus 86. For example, the 8086 chip uses a 16 bit bus while the 80386 processor utilizes a 32 bit bus. The microprocessor 96 chip size is a function of the desired control system execution rate and the amount of mathematical operations needed to perform. For this control system, the amount of mathematical computations is a function of the quantity of thermal sensors, n, being employed since the optimal estimation routine performs the inversion of two $n \times n$ matrices. The most economical design would be to use the 8086 for the microprocessor 98 with the 8087 for the coprocessor 98.

The RWA 28 is a self contained package which contains the reaction wheel, the torque motor and the wheel drive electronics. The wheel drive electronics package includes the motor and power drivers. For most applications, the RWA 28 is generally purchased as an off the shelf, space qualified item that is known in the art. The required torque capability of the reaction wheel is a function of both the vehicle core-body torque authority and the magnitude of the predicted TES disturbance. The necessary array reaction wheel torque can be estimated by evaluating the vehicle attitude pointing performance when the spacecraft is subjected to the TES disturbance in a manner known to those skilled in the art.

The control system 22, except for the thermal sensor network 24, can be physically housed in a rectangular container 50 having the approximate dimensions of 0.20 m×0.26 m×0.26 m. The control system 22, less the thermal sensor network 24, is mounted in the yoke of the solar panel 34 formed by the members 58 and 60 to the inner portion 52 as shown in FIG. 2. The thermal sensors 36 and 38 are hard-wired from their fixed positions on the solar panel 34 to the control system box 50. Fortunately, many spacecraft already have thermal sensors on one or both of the solar panel surfaces. Thus, a connection between the existing thermal sensors and the control system would satisfy all of the temperature measurement needs of the system. Additional thermal sensors could be added to assure a minimum number of sensors exists on each array face. A minimum of two slip rings would be required (four for one redundant set, six for two redundant sets, etc.) for the power connections, one for the outgoing signal and one for the return signal. However, these would normally already be present and would be used in a manner known to those skilled in the art. The supply voltage for the system would be generated using the spacecraft batteries, since the TES disturbance occurs during the penumbral transitions to and from the umbra, and is estimated to be 28 volts dc. The maximum power consumption is predicted to be 100 watts while a steady state power requirement of 10 watts is sufficient. Communications would be provided by the vehicle ground communications system, e.g. tracking and data relay satellite system (TDRSS).

The control system 22 would be connected to the vehicle communications system 102 using the RIU 100. The communication and data transfer link would also require use of the slip ring assembly (not shown). A total of nine slip rings are necessary for the RIU 100 connection in order for the control system computer to receive uplinked ground commands and download telemetry information.

The spacecraft thermal disturbance control system 22 is used and operates in the following manner. The sun-pointing (hot) surface of a solar array or other spacecraft appendage receives incoming solar radiation, Earth infrared radiation (EIR) and Earth reflected solar (albedo) which act to heat this surface. The anti-sun (cold) pointing surface receives contributions from only the EIR and albedo. Both surfaces also radiate energy to space. Due to the differential heating and thermal expansion of the surface materials, the hot surface expands further than the cold surface. This causes the array to bend or droop and remain in this position until the vehicle enters the Earth's shadow cone or umbra. During entrance to the umbra, the spacecraft experiences a rapid cooling effect as the dominant heat source (the solar radiation) is removed from the hot surface. The absence of the solar radiation causes the thermal gradient across the array to decrease in an exponential fashion. The change in thermal gradient as a function of time results in a non-constant rate bending motion of the array. Essentially, the hot surface experiences a thermal compression which will eventually reach a thermal equilibrium state as the thermal gradient approaches a constant value. This phoenomena is TES. The bending of the array introduces a disturbance torque about the fixed end of the structure, which is then transferred back onto the vehicle main-body. The proposed control system will use a distributed thermal sensor network to measure the temperature of each array surface at several locations. An optimal estimation technique is then employed to compute an estimate of the thermal gradient at a specified position. First and second derivatives of the thermal gradient are computed and used to estimate the TES disturbance torque. The TES disturbance torque prediction is applied via a small RWA in order to eliminate and/or minimize the true TES disturbance. The process is similar for umbra exit except the thermal gradient increases in an exponential fashion.

Although the invention has been described in considerable detail with respect to a certain preferred embodiment, it will be understood and appreciated that various modifications and changes may be made to the invention without departing from the spirit and scope of the invention as defined in the appended claims.

I claim:

1. A spacecraft thermal disturbance control system for a spacecraft with a main portion and a projecting potion extending from said main portion which is to be subjected to a thermal gradient which in turn produces a torque exerted on the main portion of said spacecraft comprising a plurality of thermal sensors located on said projecting portion of the spacecraft projecting from the main portion of the spacecraft; control means operatively connected to said thermal sensors for receiving temperature information from said thermal sensors and for providing control commands based upon the received temperature information to counter said thermal gradient torque exerted on the main portion of said spacecraft as a result of a thermal gradient being applied to said projecting portion of the spacecraft projecting from the main portion of the spacecraft; and anti-torque means operatively connected to said control means for providing a torque based upon commands received from said control means to counter the torque exerted on the main portion of said spacecraft as a result of a thermal gradient being applied to the projecting portion of said spacecraft.

2. The spacecraft thermal disturbance control system of claim 1 wherein said control means includes means for estimating a thermal gradient on said projecting portion of said spacecraft based upon temperature measurements from said thermal sensors.

3. The spacecraft thermal disturbance control system of claim 2 wherein said control means includes means for predicting the magnitude of torque based upon the thermal gradient information obtained from said thermal gradient estimating means.

4. The spacecraft thermal disturbance control system of claim 3 wherein said projection portion of the spacecraft has two sides and wherein said thermal sensors are located on both of said sides.

5. The spacecraft thermal disturbance control system of claim 4 wherein said thermal sensors located on both sides of said projecting portion of the spacecraft comprise an array of thermal sensors located on each side of the two sides of said projecting portion of the spacecraft.

6. The spacecraft thermal disturbance control system of claim 3 wherein said spacecraft has a communication system and wherein said control means includes remote interface means for communicating with said spacecraft communication system.

7. The spacecraft thermal disturbance control system of claim 6 wherein said control means includes means for receiving electrical power from said spacecraft.

8. The spacecraft thermal disturbance control system of claim 7 wherein said means for receiving electrical power from said spacecraft includes a power converter.

9. The spacecraft thermal disturbance control system of claim 3 wherein said control means includes a microprocessor.

10. The spacecraft thermal disturbance control system of claim 9 wherein said control means also includes an analog to digital converter operatively connected to said thermal sensors.

11. The spacecraft thermal disturbance control system of claim 10 wherein said control means also includes a programmable peripheral interface operatively connected to said thermal sensors.

12. The spacecraft thermal disturbance control system of claim 11 wherein said control means includes a voltage making circuit operatively connected to said thermal sensors.

13. The spacecraft thermal disturbance control system of claim 9 wherein said control means includes a digital to analog converter operatively connected to said antitorque means.

14. The spacecraft thermal disturbance control system of claim 13 wherein said antitorque means comprises a reaction wheel assembly.

* * * * *